United States Patent
Grundman

[11] 3,823,480
[45] July 16, 1974

[54] BATTER BOARDS
[76] Inventor: Thomas B. Grundman, 513 Park Ave., Cherokee, Iowa 51012
[22] Filed: May 17, 1972
[21] Appl. No.: 250,834

[52] U.S. Cl. .................................. 33/86, 33/1 LE
[51] Int. Cl. ....................................... E04g 21/18
[58] Field of Search .......... 33/85, 86, 92, 1 G, 1 H, 33/1 LE; 248/156, 188.6; 49/381; 135/3 R, 4 R; 160/229, 136; 116/63 P

[56] References Cited
UNITED STATES PATENTS
| | | | |
|---|---|---|---|
| 1,651,221 | 11/1927 | O'Maley | 116/63 P |
| 1,670,635 | 5/1928 | Plath | 33/92 |
| 2,934,826 | 5/1960 | Klaum | 33/1 LE |
| 3,250,009 | 5/1966 | Oseka | 33/86 |
| 3,381,379 | 5/1968 | Fergen | 33/86 |

FOREIGN PATENTS OR APPLICATIONS
| | | | |
|---|---|---|---|
| 217,319 | 2/1957 | Australia | 49/381 |
| 700,207 | 11/1953 | Great Britain | 33/86 |
| 297,344 | 3/1931 | Italy | 116/63 |

Primary Examiner—Louis R. Prince
Assistant Examiner—Willis Little
Attorney, Agent, or Firm—Zarley, McKee & Thomte

[57] ABSTRACT

A pair of frames rectangular in shape are formed from circular in cross section material and pivotally interconnected at one end with the opposite ends being held in spaced apart 90° relationship by a brace member. The top frame portion of each frame includes a rotatable and slidable line holder having a hand-adjustable setscrew. A pair of stakes are secured to the bottom frame portions of each frame by flexible chains and include flanges for engaging the bottom frame portions when the stakes are driven into the ground for holding the batter boards in place.

4 Claims, 7 Drawing Figures

PATENTED JUL 16 1974 3,823,480
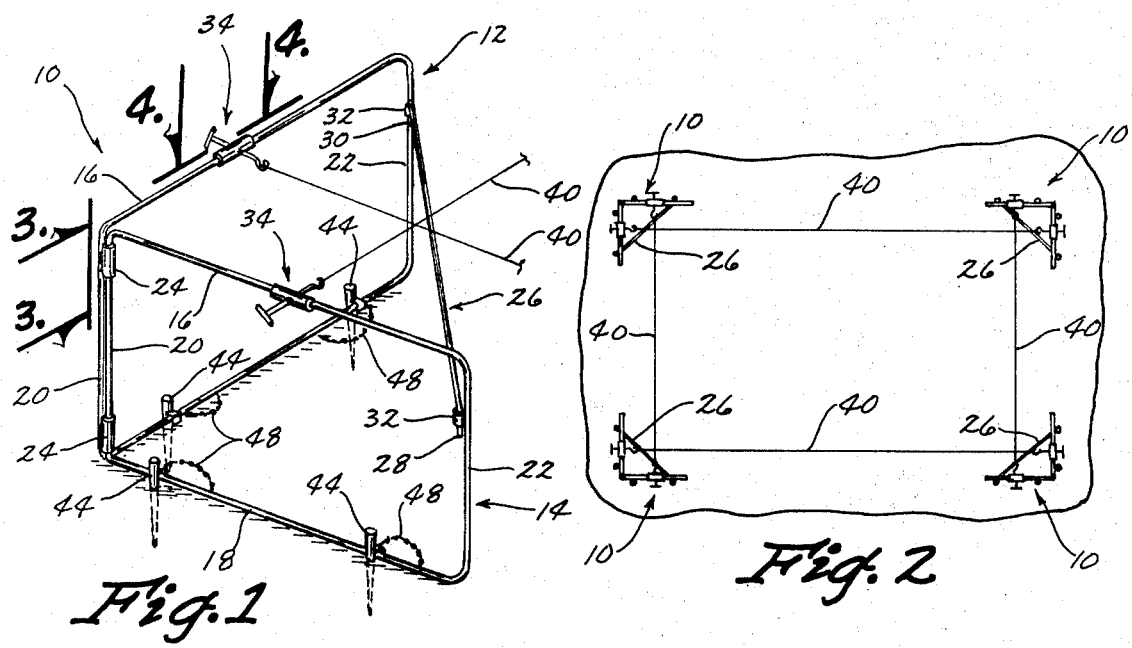
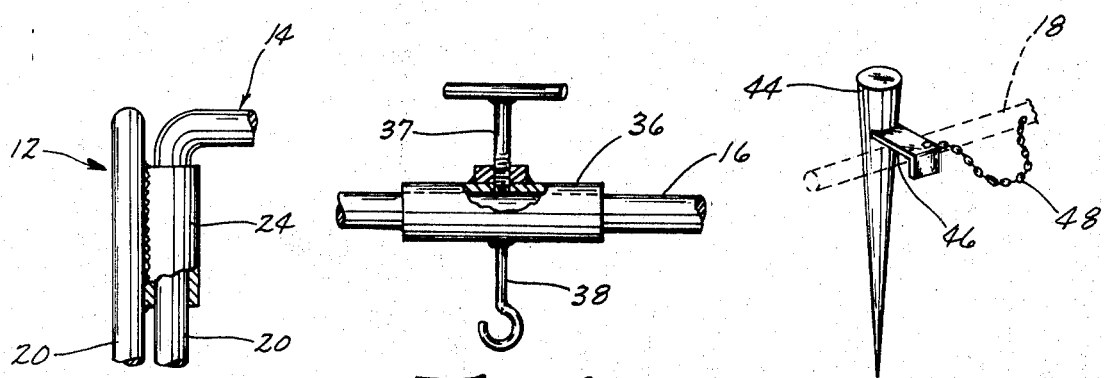
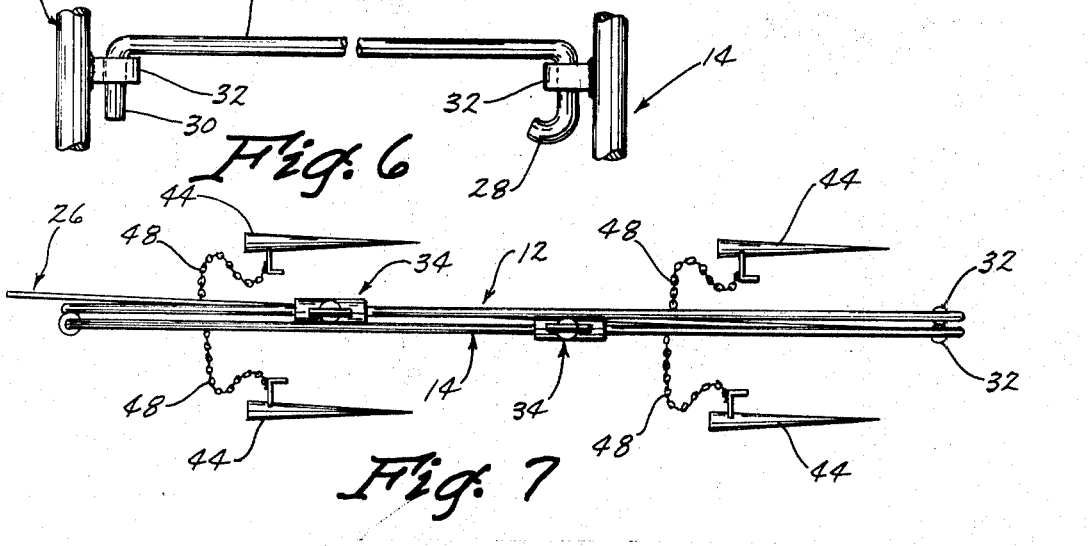

BATTER BOARDS

Batter boards commonly used comprise wooden pieces rigidly nailed together and then driven into the ground. These batter boards are not dependable and are time consuming to construct. After they are used they are usually discarded as they are too cumbersome to store and not durable enough to be reused. They further lack flexibility in operation in that adjustments cannot be readily made.

A batter board, to be dependable, must be capable of being held reasonably rigidly in place usually with a ninety degree angle between the frame sections. A line-holding means should be provided which is readily adjustable. Further, the batter board should be capable of standing stably on soft and uneven ground.

The batter boards of this invention are easily constructed from circular in cross section tube or rod material into rectangular frames. The frames at one end are interconnected while the opposite ends are held in spaced ninety degree angular relationship by a brace. A line holder is provided on the top frame portion of each of the frames and includes a sleeve for rotatable and slidable adjustment. A hand-operated setscrew extends from the sleeve in one direction opposite a hook bolt for line engagement. A pair of stakes are loosely attached to each of the bottom frame portions and include perpendicularly extending hook elements for engaging the bottom frame portions.

The frames being rectangular in shape are quite stable on soft ground as the entire bottom portions of each frame engage the ground and the rectangular configuration gives sufficient strength to the entire structure to prevent it from yielding in any direction. The unit is simple and light weight having substantially open areas between the top, bottom and opposite end frame portions.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the batter boards in use.

FIG. 2 is a reduced in scale top plan view of a building site employing batter boards at each corner.

FIG. 3 is a cross sectional view taken along line 3—3 in FIG. 1.

FIG. 4 is a fragmentary cross sectional view taken along line 4—4 in FIG. 1.

FIG. 5 is an enlarged perspective view of one of the stakes connected to a bottom frame portion shown in dash lines.

FIG. 6 is a fragmentary view of the brace member.

FIG. 7 is a top plan view of the batter boards in their collapsed storage position.

The batter board assembly of this invention is referred to generally in FIG. 1 by the reference numeral 10 and includes rectangular batter board frames 12 and 14 formed from continuous circular in cross section tube or rod material. Each of the frames include top and bottom frame portions 16 and 18 interconnected by opposite end frame portions 20 and 22.

The two end frame portions 20 are pivotally interconnected by a pair of hinge sleeves 24 being welded to the end portion 20 of frame 12 while the end portion 20 of frame 14 is pivotally received therein. The opposite end frame portions 22 are interconnected by a brace 26 pivotally connected to frame 14 and detachably connected to frame 12, as seen in FIG. 6. The brace 26 includes a return bend 28 on one end and a L-shaped portion 30 on the opposite end. A pair of eye elements 32 are provided on each of the outer end frame portions 22 for engagement with the base portions 28 and 30.

A line holder 34, as seen in FIG. 4, is provided on each of the top frame portions 16 and includes a sleeve 36 slidable and rotatable on the frame portion 16 with a hand-adjustable setscrew 37 on the sleeve for engagement with the top frame portion 16 to lock the line holder in a desired position. Extending from the sleeve 36 in a parallel but opposite direction is a line hook bolt 38 adapted to have lines 40 connected thereto as seen in FIGS. 1 and 2.

A batter board assembly is held in place on the ground, as seen in FIG. 1, by a pair of stakes 44 having perpendicularly extending flanges 46 for engagement over the top of the bottom frame portions 18. A flexible chain 48 also extends between the flange 46 and the bottom frame portion 18.

In FIGS. 1 and 7, the batter board assembly is shown in two different positions. In FIG. 7 the batter board frames 12 and 14 are folded into a parallel overlying relationship with the brace 26 similarly folded. The stakes 44 are loosely connected and cannot become lost. It is seen that a minimum space is required for storage purposes. When it is desired to use the batter board assembly 10 it is only necessary to fold the two frame sections 12 and 14 to a position 90° apart, as seen in FIG. 1, and the preset brace 26 will hold the frames in this position during use. The stakes 44 are positioned with the flanges 46 over the bottom frame portions 18 and driven into the ground whereby the batter board assembly cannot move under ordinary circumstances. The substantial ground engagement provided by the bottom frame portions 18 engaging the ground throughout their length assure the batter board assembly remaining stable throughout use on soft or unlevel ground. Quick assembly and disassembly is seen as one of the capabilities of the batter board assembly and also the adjustment of the lines 40 is quickly accomplished by operation of the slidable and rotatable line holders 34 on the top frame portion 16.

Thus it is seen that the batter board frame assembly is durable, light weight, dependable in use, easy to assemble and disassemble, occupies a small amount of space when being stored, and all parts are interconnected preventing loss of any part.

I claim:

1. A batter board assembly comprising,
   a pair of batter boards,
   each of said batter boards having a rectangular frame and including top, bottom, and opposite end frame portions,
   said rectangular frames being formed out of continuous circular in cross section material and being substantially open between said top, bottom and opposite end frame portions,
   said pair of batter boards being pivotally interconnected by a hinge being provided between one of said end frame portions in each of said batter boards,
   said batter boards being adapted to pivot between first and second positions with said batter boards being perpendicularly to each other in said first position and being parallel to each other in said second position, a brace extending between the outer free ends of said frames to maintain said frames in said first position, and a line holder movably mounted on each of said top frame sections, and each of said line holders including a sleeve rotatable and slidable on said top frame portion and a hand adjustable setscrew on said sleeve adjustably engages said top frame portion, and a hook element being provided on the opposite side of said sleeve from said hand adjustable setscrew to support said line.

2. A batter board assembly comprising, a pair of batter boards, each of said batter boards having a rectangular frame and including top, bottom, and opposite end frame portions, said paid of batter boards being pivotally interconnected by a hinge being provided between one of said end frame portions in each of said batter boards, said batter boards being adapted to pivot between first and second positions with said batter boards being perpendicularly to each other in said first position and being parallel to each other in said second position, a brace extending between the outer free ends of said frames to maintain said frames in said first position, at least one ground engaging stake having a flange engaging each of said bottom frame portions, said stakes being loosely connected to said bottom frame portions by a flexible chain, said flange on each of said stakes being rigidly perpendicular to said stakes, and a line holder movably mounted on each of said top frame sections.

3. A batter board assembly comprising, a pair of batter boards, each of said batter boards having a rectangular frame and including top, bottom, and opposite end frame portions, said bottom frame portions engaging the ground along their substantial length, said rectangular frames being formed out of continuous rod material, and said frames being substantially open between said top, bottom and opposite end frame portions, said pair of batter boards being pivotally interconnected by a hinge being provided between one of said end frame portions in each of said batter boards, said batter boards being adapted to pivot between first and second positions with said batter boards being perpendicularly to each other in said first position and being parallel to each other in said second position, a brace extending between the outer free ends of said frames to maintain said frames in said first position, said brace being pivotally connected at one end to the other of said end frame portions on one of said frames and detachably connected to the other end frame portion on the other of said frames when in said first position and said brace being adapted to be pivoted into a position parallel to said frames in said second position, and a line holder slidably and rotatably mounted on each of said top frame sections and having a hook element to support a line.

4. The structure of claim 3 wherein each of said line holders includes a sleeve, a hand adjustable setscrew on said sleeve adjustably engages said top frame portion, and said hook element is provided on the opposite side of said sleeve from said hand adjustable set-screw to support said line, a hook element being provided on the opposite side of said sleeve from said hand adjustable setscrew to support said line.

* * * * *